United States Patent

Tapper et al.

Patent Number: 5,520,860
Date of Patent: May 28, 1996

[54] PROCESS FOR PREPARING GRANULAR SODIUM SILICATES

[75] Inventors: Alexander Tapper, Mönchengladbach; Günther Schimmel, Enftstadt; Hans-Peter Rieck, Hofheim; Gerhard Nöltner, Frankfurt am Main, all of Germany

[73] Assignee: Hoechst AG, Frankfurt am Main, Germany

[21] Appl. No.: 297,227

[22] Filed: Aug. 29, 1994

[30] Foreign Application Priority Data

Sep. 11, 1993 [DE] Germany ............ 43 30 868.6

[51] Int. Cl.⁶ .................................................. B29B 9/16
[52] U.S. Cl. ................. 264/15; 264/117; 264/118; 264/122; 264/140
[58] Field of Search ................. 264/15, 42, 43, 264/117, 118, 122, 140

[56] References Cited

U.S. PATENT DOCUMENTS

| | | | |
|---|---|---|---|
| 3,687,640 | 8/1972 | Sams et al. | 23/313 |
| 3,931,036 | 1/1976 | Pierce | 264/117 |
| 4,218,502 | 8/1980 | Graham et al. | 428/144 |
| 4,703,029 | 10/1987 | Rieck et al. | |
| 5,236,682 | 8/1993 | Schimmel et al. | |

FOREIGN PATENT DOCUMENTS

| | | |
|---|---|---|
| 0075250 | 3/1983 | European Pat. Off. |
| 0425427 | 5/1991 | European Pat. Off. |
| 0425428 | 5/1991 | European Pat. Off. |
| 2014674 | 10/1971 | Germany |
| 2420297 | 11/1974 | Germany |
| WO9113026 | 9/1991 | WIPO |

OTHER PUBLICATIONS

Advanced Inorganic Chemistry, F. Albert Cotton et al., ©1980, p. 389 "Infinite Sheet Anions".

*Primary Examiner*—Robert A. Dawson
*Assistant Examiner*—Kenneth M. Jones
*Attorney, Agent, or Firm*—Connolly & Hutz

[57] ABSTRACT

To prepare a compacted, granular sodium silicate having an $SiO_2/Na_2O$ molar ratio of 1.7:1 to 4.1:1, sodium silicate having a median particle diameter of <500 μm is first mixed with a material increasing its hardness before being converted into pressed granules having particle sizes of 0.1 to 5 mm by compacting, comminution and screening.

7 Claims, No Drawings

PROCESS FOR PREPARING GRANULAR SODIUM SILICATES

The present invention relates to a process for preparing a compacted, granular sodium silicate having an $SiO_2/Na_2O$ molar ratio of 1.7:1 to 4.1:1, in particular 2:1 to 3.5:1.

Sodium silicates can be used for various applications. In detergents and cleaning agents they can provide the required alkalinity and exhibit good buffering properties. In addition to this, some sodium silicates possess good water-softening properties. These include primarily crystalline sheet-like sodium silicates having an $SiO_2/Na_2O$ molar ratio of about 1.7:1 to 4.1:1.

Most recently, detergents and cleaning agents have been introduced onto the market as so-called compact types, which, owing to their small pack size, are intended to contribute to the desired reduction of packaging material. The compact types usually only contain ingredients having high bulk density while doing without standardizing agents or fillers.

U.S. Pat. No. 5,236,682 discloses a process for preparing crystalline sodium silicates of sheet structure in which amorphous sodium silicate having a water content of 15 to 23% by weight is calcined in a rotary kiln at temperatures of 500° to 850° C., the calcined material, after being crushed and milled, is transferred to a roll compactor and then pressed to give flakes which, after precomminution and screening, are processed to give granules having a bulk density of 700 to 1000 g/l.

The disadvantage of these granules is their low abrasion resistance which manifests itself negatively during their pneumatic conveying, in particular during rapid-flight conveying, in the formation of an undesirably high amount of dust.

Accordingly, the object of the invention is to indicate a process for preparing a compacted, granular sodium silicate which withstands abrasive effects, for example mechanical conveying, essentially without damage. This is achieved according to the invention by first intimately mixing the sodium silicate having a median particle diameter of <500 μm with a material increasing its hardness before converting it into pressed granules having particle sizes of 0.1 to 5 mm by compacting, comminution and screening.

In other embodiments of the process according to the invention, a) an effective amount of the material increasing the hardness of the sodium silicate is added to the sodium silicate in an amount of up to 5% by weight;

b) after production of the pressed granules, the sodium silicate is first mechanically rounded;

c) the pressed granules are optionally, additionally coated with the material increasing their hardness in an amount of up to 6% by weight, relative to the sodium silicate;

d) the material increasing the hardness of the sodium silicate is at least one substance from the group comprising water, silica sol, silica gel, nonionic, anionic or cationic surfactants, water glass, liquid or dried water glass solutions, maleic acid and/or acrylic acid and polymers and copolymers thereof;

e) the conversion into the pressed granules is carried out at temperatures of 15° to 180° C.;

f) the additional coating of the pressed granules with the material increasing their hardness is carried out at a temperature of between 15° and 130° C.;

g) granulation of the sodium silicate is carried out on a roll compactor in combination with integrated comminution of the flakes formed.

The abrasion mentioned in the examples below was determined by first measuring the particle size distribution of a 50 g sample by screening analysis (apparatus used: RETSCH VIBRATONIC) and determining therefrom the median particle diameter: $d_{50}$ (original).

The combined screening fractions from the above screening analysis are then transferred to a ball mill (metal cylinder of 11.5 cm in diameter and 10 cm in depth equipped with removable lid and containing 8 steel balls of 20 mm in diameter and weighing 32.6 g each) and milled in at 100 rpm for 5 minutes. This is followed by determining the median particle diameter: $d_{50}$ (after testing). Abrasion is calculated by the following formula:

% Abrasion=$d_{50}$ (original)–$d_{50}$ (after testing)·100 divided by $d_{50}$ (original)

Example 1 (Comparative Example)

30 kg of sodium silicate (SKS-6 from Hoechst AG) comprising essentially $\delta$-$Na_2Si_2O_5$ and having a median particle diameter of 120 μm were processed on a roll compactor at a compacting pressure of the compacting rolls of 30 KN/cm of roll width, followed by comminution of the flakes in a screening granulator and screening to give dust-free granules.

The granules had a median particle diameter of 615 μm, and their abrasion was 45.7%.

Example 2 (according to the invention)

In an Eirich mixer, 2% of a 45% by weight water glass solution ($SiO_2/Na_2O$ molar ratio: 2.0) was sprayed onto 30 kg of sodium silicate (SKS-6 from Hoechst AG) comprising essentially $\delta$-$Na_2Si_2O_5$ and having a median particle diameter of 120 μm. The resulting mixture was processed by the procedure of Example 1 to give dust-free granules.

The abrasion of the granules was 30.9%.

Example 3 (according to the invention)

Example 2 was repeated, except that 3% of the water glass solution was applied by spraying.

The abrasion of the granules was 25.8%.

Example 4 (according to the invention)

Example 2 was repeated, except that 4% of the water glass solution was applied by spraying.

The abrasion of the granules was 21.3%.

Example 5 (according to the invention)

In an Eirich mixer, 3% of a fatty alcohol polyglycol ether molten (®Genapol OA-80 from Hoechst AG) was sprayed onto 30 kg of sodium silicate (SKS-6 from Hoechst AG) comprising essentially $\delta$-$Na_2Si_2O_5$ and having a median particle diameter of 120 μm. The resulting mixture was processed by the procedure of Example 1 to give dust-free granules.

The abrasion of the granules was 35.0%.

Example 6 (according to the invention)

Example 5 was repeated, except that the fatty alcohol polyglycol ether applied by spraying was ®Genapol T-500 (Hoechst AG).

The abrasion of the granules was 25.2%.

Example 7 (according to the invention)

In an Eirich mixer, 3% of a fatty alcohol polyglycol ether molten (®Genapol OA-70 from Hoechst AG) was additionally sprayed onto the dust-free granules prepared by Example 2.

The coated granules had an abrasion of 6.9%.

Example 8 (according to the invention)

Example 7 was repeated, except that fatty alcohol polyglycol ether applied by spraying was ®Genapol T-500 (Hoechst AG).

The coated granules had an abrasion of 2.6%.

We claim:

1. A process for preparing compacted, granular layered sodium silicate having an $SiO_2/Na_2O$ molar ratio of 1.7:1 to 4.1:1, which comprises first intimately mixing a sodium silicate having a median particle diameter of <500 μm with an effective amount of material increasing its hardness and subsequently converting the sodium silicate into pressed granules having particle sizes of 0.1 to 5 mm by granulation on a roll compactor with integrated comminution of the flakes which are formed and screening.

2. The process as claimed in claim 1, wherein the material increasing the hardness of the sodium silicate is added to the sodium silicate in an amount of up to 5% by weight.

3. The process as claimed in claim 1, wherein after production of the pressed granules, the sodium silicate is first mechanically rounded.

4. The process as claimed in claim 1, wherein the pressed granules are optionally, additionally coated with the material increasing their hardness in an amount of up to 6% by weight, relative to the sodium silicate.

5. The process as claimed in claim 1, wherein the material increasing the hardness of the sodium silicate is a substance selected from the group consisting of water, silica sol, silica gel, nonionic, anionic or cationic surfactants, water glass, liquid or dried water glass solutions, maleic acid and acrylic acid and polymers and copolymers thereof.

6. The process as claimed in claim 1, wherein the conversion into the pressed granules is carried out at temperatures of 15° to 180° C.

7. The process as claimed in claim 4, wherein the additional coating of the pressed granules with the material increasing their hardness is carried out at a temperature of between 15° and 130° C.

* * * * *